(12) United States Patent
Janeke

(10) Patent No.: US 10,443,929 B2
(45) Date of Patent: *Oct. 15, 2019

(54) SYSTEM, APPARATUS AND METHODS FOR A SUPERDUCT BASED ON A THERMALLY REACTIVE NOSECONE

(71) Applicant: Charl E. Janeke, Los Angeles, CA (US)

(72) Inventor: Charl E. Janeke, Los Angeles, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 15/473,077

(22) Filed: Mar. 29, 2017

(65) Prior Publication Data

US 2017/0284736 A1     Oct. 5, 2017

Related U.S. Application Data

(60) Provisional application No. 62/316,435, filed on Mar. 31, 2016.

(51) Int. Cl.
*F25J 1/02* (2006.01)
*F25J 1/00* (2006.01)
*H02G 15/34* (2006.01)

(52) U.S. Cl.
CPC ........... *F25J 1/0276* (2013.01); *F25J 1/0007* (2013.01); *F25J 1/0067* (2013.01); *F25J 1/0072* (2013.01); *F25J 1/0205* (2013.01); *F25J 1/0221* (2013.01); *F25J 2210/42* (2013.01); *F25J 2240/40* (2013.01); *H02G 15/34* (2013.01)

(58) Field of Classification Search
CPC .... H02G 15/34; F25J 2210/42; F25J 2240/40; F25J 1/0221; F25J 1/0067; F25J 1/0072; F25J 1/0205; F25J 1/0007; F25J 1/0276
See application file for complete search history.

(56) References Cited

U.S. PATENT DOCUMENTS

| | | | | |
|---|---|---|---|---|
| 4,573,648 A * | 3/1986 | Morenus | ............... | F42B 10/663 102/503 |
| 6,536,350 B2 * | 3/2003 | Cartland | ................... | F02K 7/10 102/374 |
| 7,344,111 B2 * | 3/2008 | Janeke | ..................... | B64G 1/14 244/158.9 |
| 8,215,589 B2 * | 7/2012 | Janeke | ..................... | B64G 1/62 244/158.9 |
| 2015/0048208 A1 * | 2/2015 | Janeke | ................... | B64C 30/00 244/130 |

* cited by examiner

*Primary Examiner* — Ana M Vazquez
(74) *Attorney, Agent, or Firm* — J. Curtis Edmondson

(57) ABSTRACT

A system, apparatus and method for a superduct representing a unique process for helium distillation/liquefaction by means of a hypersonic stochastic switch is described. A supersonically expanded isentropic continuum is switched into a stochastic vortex flux by means of a thermally reactive slanted shafted nosecone and an extreme high pressure source hypersonic vortex flux. The concept can be further developed to a bridge spanning 1-10 miles of superduct segments, owing to its virtual nature and extreme power packaged kinetic energy of the hypersonic stochastic motive system.

11 Claims, 14 Drawing Sheets

SYSTEM, APPARATUS AND METHODS FOR A SUPERDUCT BASED ON A THERMALLY REACTIVE NOSECONE

CROSS REFERENCE TO RELATED APPLICATIONS

The present application claims priority to U.S. Provisional Patent Application No. 62/316,435, filed on Mar. 31, 2016 and entitled "Apparatus and Methods for A Stochastic Switch", which is herein incorporated by reference in its entirety.

BACKGROUND

Although helium is the second most abundant element in the universe, helium has a minimal evolutionary or cosmic furnace presence of 5 ppm atmospheric on planet earth. However, helium is also a byproduct of radioactive decay in the core of the earth that reappears as a natural gas component, whereby helium is recovered via fractional distillation by liquefaction of the natural gas component and hence compressed for bulk transportation to avoid cryogenic chilling and bulk liquefaction complications.

In accordance with the present state of art for liquefaction of helium it is limited to (1) Linde (1913)—compression regression method and Claude (1950)—Turbo Expansion cryogenic chilling reaching up to 2-4K Helium distillation/liquefaction threshold. Because refrigeration becomes exponentially complex in the cryogenic zone, Carnot efficiency falls dramatically below 50K whereby the cost @4K refrigeration=75× cost @300K refrigeration (and 150× multiplier @2K). Both Liquid Nitrogen and Liquid Hydrogen are relative cheap abundant commodities and the cost of pre/sub cooling is in the limits of economical budgets.

Hence there is a need for a more economical method for helium liquefaction wherein a superduct structure becomes an infinite superconductor and liquid helium transportation conduit requiring fractional pumping/compression motive force as to Liquefaction infrastructure and ancillaries.

SUMMARY

In a preferred embodiment, a consonance of a number of singularities or switches into a rational cryogenic refrigeration engine is described. More specifically towards a superconductor transmission line/conduit conforming simultaneously as a liquid helium distillation plant. The process may consequentially by development reformatted into autonomous 1-10 mile superduct superconductor conduits bridging trans-continental generator/city divides with 99.99% transmission efficacy. Because of (1) the extreme efficiency of hypersonic vortex tube and Carnot refrigeration conversion in the cryogenic zone and (2) zero loss superconductor phenomenon in the 4K ABSOLUTE zone, the superduct superconductor refrigeration engine defaults into a liquid helium distillation plant in addition to performing the primary superconductor refrigeration purpose. The singularities/switches technology however lends itself additionally to adaptation of extreme process and natural/social/stellar sciences problem solving.

As for carnot efficiency (coefficient of performance) the COP=heat removed/work input. Given heat removed=latent heat of evaporation of Helium=10 Btu/lb and work of compression @Pr=100 (10>>1500 psi), COP=10/nRT [100^0.286−1]=10/(1.4×53×10×(3.7−1))/788=10/2003/778=10/2.5=4.0; which is 100× superior to Claude/Linde processes.

However, because the zero-loss uniqueness of the superduct vortex tube superconductor conduit within the 4K superconductive zone, only the first superduct stage will require helium compression, then the distilled liquid helium will be regressively flashed and pumped as a superfluid @4/5/6K from 0.5 to +100 atm into the critical 1,000 to 5,000 psi pressure zone, regeneratively intercooling the second and consequential (n+1) superduct stages. With the regenerative stage set the superduct becomes an infinite superconductor and liquid helium transportation conduit requiring fractional pumping/compression motive force as to infrastructure and ancillaries.

In another preferred embodiment, a superduct synthesis on a thermally reactive nosecone comprising a tip, the tip having a slanted intake aperture; a shaft; a thermally reactive bore and the nosecone functioning as a hypersonic vortex generator is described. A high pressure supersonic isentropic expansion nozzle additionally whereby liquid helium is distilled out of compressed helium by means of an incipient shockwave being transformed into a stochastic vortex flux via the thermally reactive shafted nosecone vortex tube, the primary stochastic vortex flux is transformed into a contra-rotating double helix vortex by means of a sudden Coanda expansion at the tail end of the vortex tube spawning Joule-Thomson throttling (refrigeration), the exit (double helix) vortex flux is reset into a supersonic (isentropic) continuum downstream of the Coanda expansion ramp by means of planetary spline slots and a consequential contra-rotating vortex flux spawning second tier Joule-Thomson refrigeration in conformance with the first Law of thermodynamics whereby dQ=dh=pdV.

In another preferred embodiment, a superduct synthesis is described based on a thermally reactive nosecone comprising thermally reactive nosecone, the high pressure helium source is sub-cooled into the cryogenic zone via flashing of liquid nitrogen proximal 70K prior to hypersonic isentropic expansion and stochastic conversion, wherein the high pressure helium source is (regenerative) chilled proximal 35K prior to hypersonic expansion (10K post hypersonic expansion) enabling complex Carnot refrigeration as a consequence of stochastic gyrations and double helix vortex conversion chilling the vortex tube regressively into the 4K helium saturation domain, the vortex tube shell conforms as the complex-Carnot refrigeration core as a consequence of centrifuging and flashing of liquefied Helium on the vortex tube shell driven by the gyrating stagnation pressure surges and the double helix vortex core as the heat sink.

In another preferred embodiment, a superduct synthesis is described based on a thermally reactive nosecone comprising thermally reactive nosecone, the vortex tube is bundled into and superconducting power transmission cluster, the superduct vortex tube is by development stretched into 1-10 miles autonomous 4K superconductor, the superduct is turbocharged via a multiplicity of throttling switches.

In another preferred embodiment, a superduct synthesis is described based on a thermally reactive nosecone, the superduct with liquid helium separation means is configured into a liquid helium distillation plant in consonance with primary superconductor refrigeration conduit, regenerative chilling is achieved via flashing of liquid hydrogen proximal 35K as an autonomous enterprise resource to maximize liquid helium distillation, the distilled liquid helium is regressively flashed and pumped regressively (in lieu of compression) into the critical 2000 to 5,000 psi (enabling) expansion zone and regeneratively flashed with recurring superduct stages and finally the thermally reactive nosecone is configured as a personal (transportable) liquid helium distillation plant.

This specification is not limited to a single embodiment, rather the methods and systems presented should be construed broadly and further incorporate the material presented in the drawings.

DETAILED DESCRIPTION

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

Figure 1:
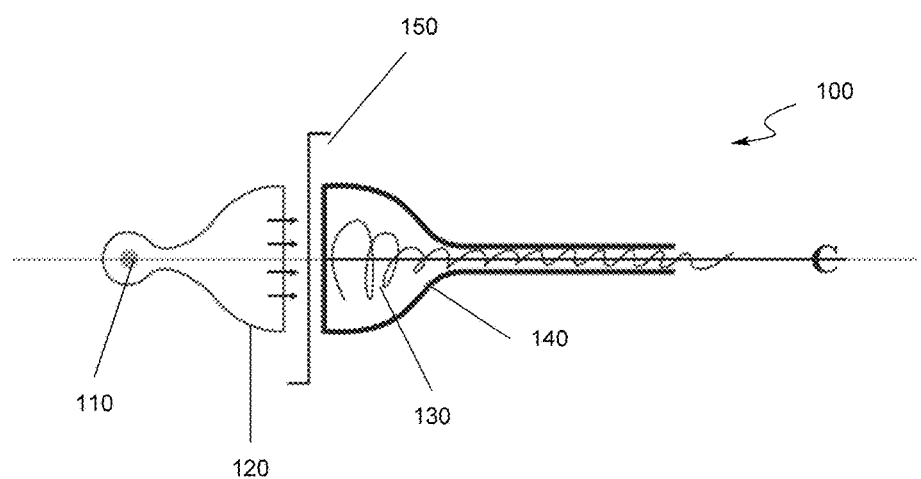
FIG. 1: Illustrates an elemental isentropic/supersonic expansion nozzle and thermally reactive nosecone.

Referring to FIG. 1, a system 100 is represented by high pressure (1/2/3/4/5/10,000 psi) helium 110 is expanded in an isentropic supersonic expansion nozzle 120 where after the MACH 2/3/4/5/10 (expanded) Helium blast engages with the thermally reactive nosecone 140 with a first switch or singularity 150 wherein the supersonic Helium blast 120 is transformed into a stochastic harmonic vortex flux 130.

Figure 2:
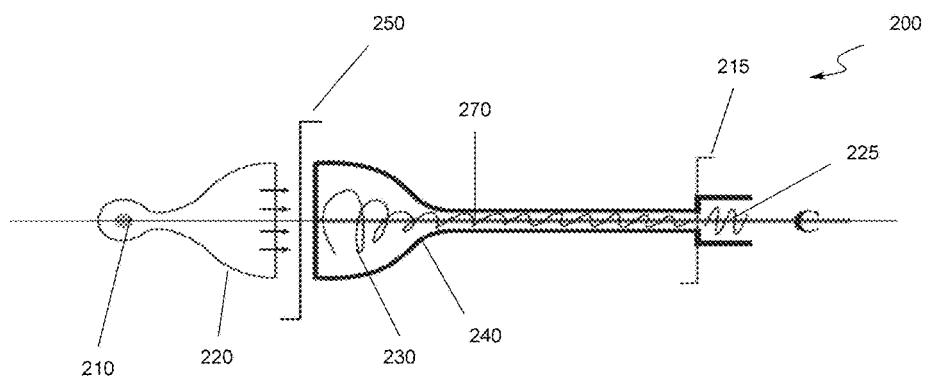
FIG. 2: Illustrates an elemental isentropic/supersonic expansion nozzle and thermally reactive nosecone with sudden Coanda expansion.

Referring to FIG. 2, a system 200 is represented by high pressure (1/2/3/4/5,000 psi) helium 210, isentropically expanded in a supersonic expansion nozzle 220 where after the MACH 2/3/4/5/10 HELIUM blast engages with the thermally reactive nosecone 240 with first switch or singularity 250, wherein the supersonic helium blast 220 is transformed into a stochastic harmonic vortex flux 230 prior to being throttled/refrigerated and transformed into a double-helix contra-rotating vortex stream 270 via sudden Coanda expansion second switch or singularity 215 at the tail end of the vortex tube, generating exit vortex stream 225.

Figure 3:
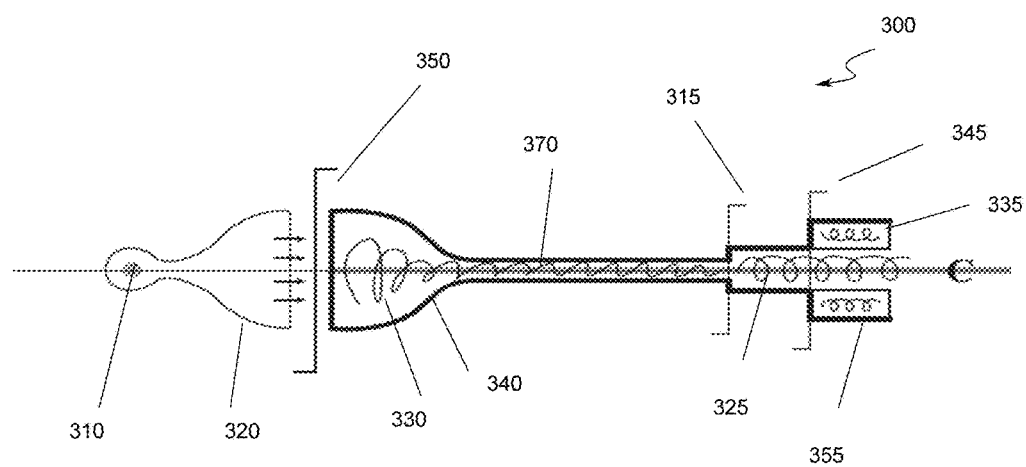
FIG. 3: Illustrates an elemental isentropic/supersonic expansion nozzle and thermally reactive nosecone with sudden Coanda expansion and planetary spline slots.

Referring to FIG. 3, a system 300 is represented by high pressure (2/3/4/5/10,000 psi) helium 310 is expanded in an isentropic supersonic expansion nozzle 320 where after the MACH 5/6/7/8/9/10 (expanded) helium blast engages with the thermally reactive nosecone 340 and first switch or singularity 350 wherein the supersonic helium blast 320 is transformed into a stochastic harmonic vortex flux 330 prior to being throttled/refrigerated (and transformed) into a double helix (contra-rotating) vortex stream 370 via sudden Coanda expansion second switch or singularity 315 at the tail end of the vortex tube where after exit vortex stream 325 is transformed into (contra-rotating) spline (vortices) 335 third switch or singularity 345 in circumferential SPLINE shafts 355.

Figure 4:
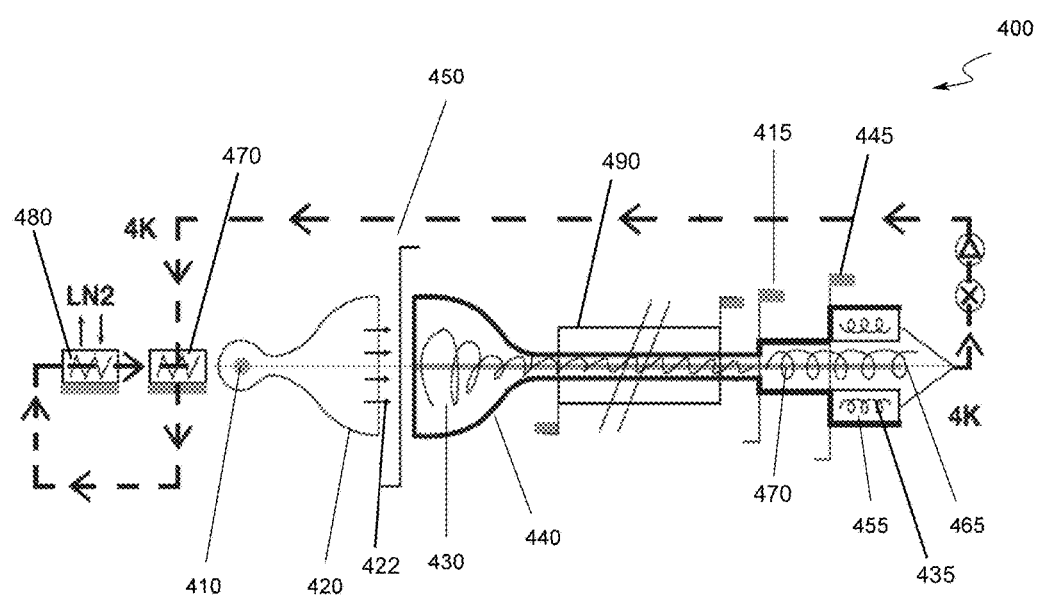
FIG. 4: Illustrates a regenerative cryogenically sub-cooled isentropic/supersonic expansion nozzle and thermally reactive nosecone with sudden Coanda expansion and planetary spline slots planetary.

Referring to FIG. 4, a system 400 is represented by a superduct process, which is initiated via a high pressure (2/3/4/5,000 psi) helium 410 source which is isentropically expanded in a supersonic expansion nozzle 420 where after the MACH 2/3/4/5/10 (expanded) helium blast 422 engages with the thermally reactive nosecone 440 and first switch or singularity 450 wherein the helium blast 422 is transformed into a stochastic harmonic vortex flux 430 prior to being throttled and transformed into a double helix contra-rotating vortex stream 470 via sudden Coanda expansion second switch or singularity 415 at the tail end of the vortex tube where after exit vortex stream 470 is transformed into (contra-rotating) spline (vortices) 435 via third switch or singularity 445 via planetary spline shafts 455 into a 4K saturated/liquefacted (isentropic) generating continuum 465. In accordance with the superduct synthesis the 4K saturated/liquefacted (isentropic) continuum 465 is henceforth (regeneratively) flashed via fourth switch 470 and pumped via fifth switch 480 and flashed via sixth switch 490 enabling 2000 to 5,000 psi (expansion) pressure threshold replicating the superduct hypersonic/stochastic switching cycle indefinitely. In isolation, the first superduct stage may however by development be transformed into an (enterprise scale) liquid helium production plant.

Figure 5A:
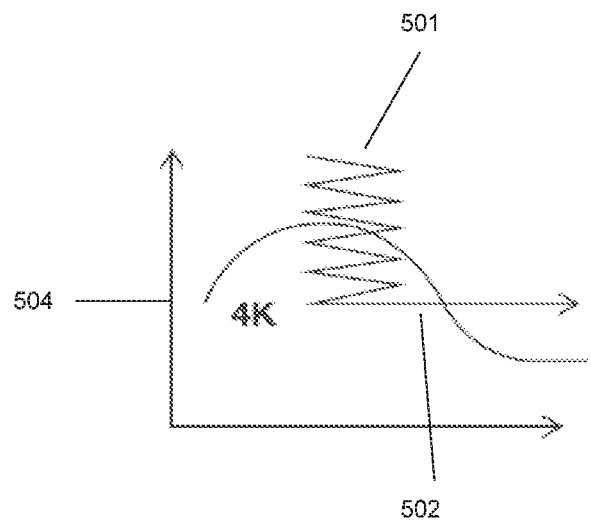
FIG. 5A illustrates a gyrating hypersonic stagnation swings curve which penetrates helium saturation curve.
Figure 5B:
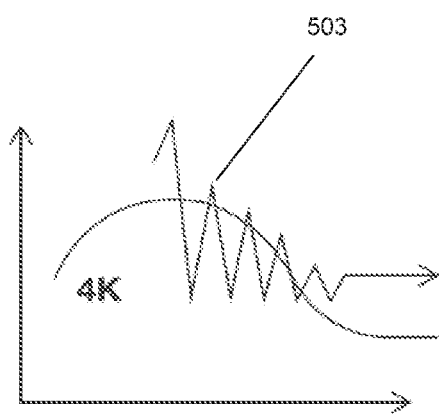
FIG. 5B illustrates a gyrating hypersonic absolute temperature swings curve which penetrates helium saturation curve.

Referring to FIG. 5A, a plot is represented by a gyrating hypersonic stagnation swings curve 520 (jointly and severally) penetrates helium saturation curve 510 triggering complex Carnot refrigeration that generates 4K absolute temperature threshold 530. In accordance with FIG. 5B gyrating (hypersonic) absolute temperature swings curve 540 penetrates helium saturation curve 510 triggering complex Carnot refrigeration that generates 4K absolute temperature threshold 530 conversely.

Figure 6:
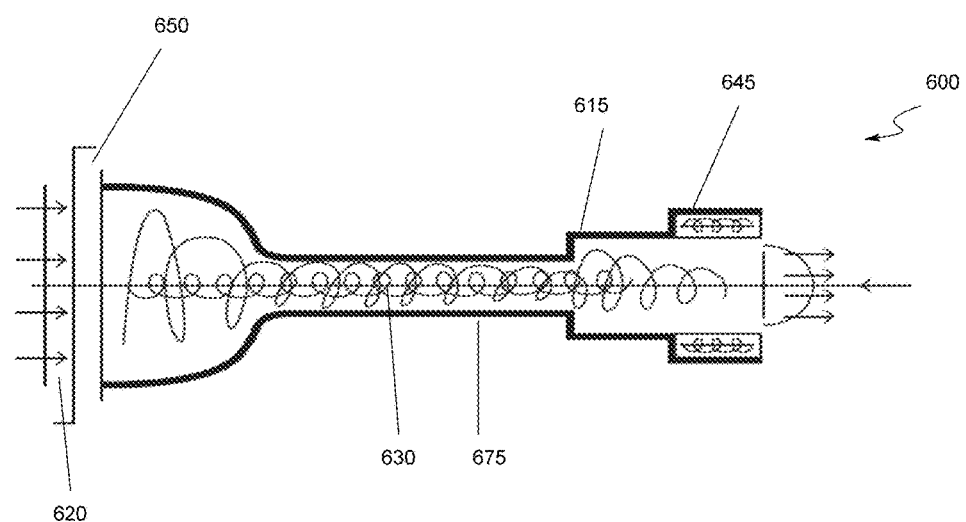
FIG. 6: Illustrates a double-helix (inner/outer) vortex interaction as a consequence of sudden Coanda expansion and planetary spline slots of an elemental isentropic/supersonic expansion nozzle and thermally reactive nosecone.

Referring to FIG. 6, a system 600 is represented by a double-helix (inner/outer) vortex interaction (concurrent with complex—Carnot heat flux) as a consequence of sudden Coanda expansion-second switch 615 and planetary spline slots third switch 645 of an elemental isentropic/supersonic expansion nozzle and thermally reactive nosecone in greater detail. Triggering (stochastic transformation) switch first switch 650 transforms hypersonic front 620 into vortex flux 630 within the confinements of vortex tube 675 with double helix and splines transformation switches. Although preferred inner/outer vortex direction has been stated, vortex orientation within the context of (i) contrarotating) double helix vortex system and (ii) complex Carnot refrigeration is irrelevant.

Figure 7:
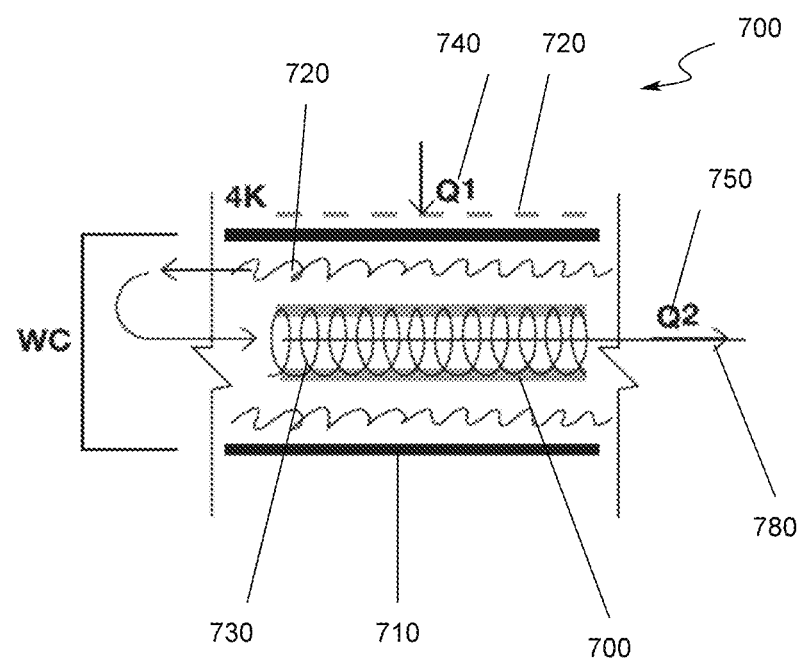
FIG. 7: Illustrates a cross section of double-helix (inner/outer) (contra-rotating) vortex streams driving the complex carnot absolute zero refrigeration engine as a consequence of sudden Coanda expansion and planetary spline slots of an elemental isentropic/supersonic expansion nozzle and thermally reactive nosecone.

Referring to FIG. 7, a system 700 is represented by a double helix core vortex flux 730 first switch is reversed within the vortex tube 710 and merges with outer vortex 720 within the vortextube slanted intake shaft and merges with the outer vortex tube to generate the exit vortex flux 780. In accordance with the superduct absolute zero synthesis the vortex tube shell functions as the cold/refrigerated plate with heat flux Q1 740 consequently being generated/withdrawn via vortex flux 720 and the heat of condensation (and stochastic work performed) Q2 750 consequently being rejected via (inner) vortex flux 730.

Figure 8:
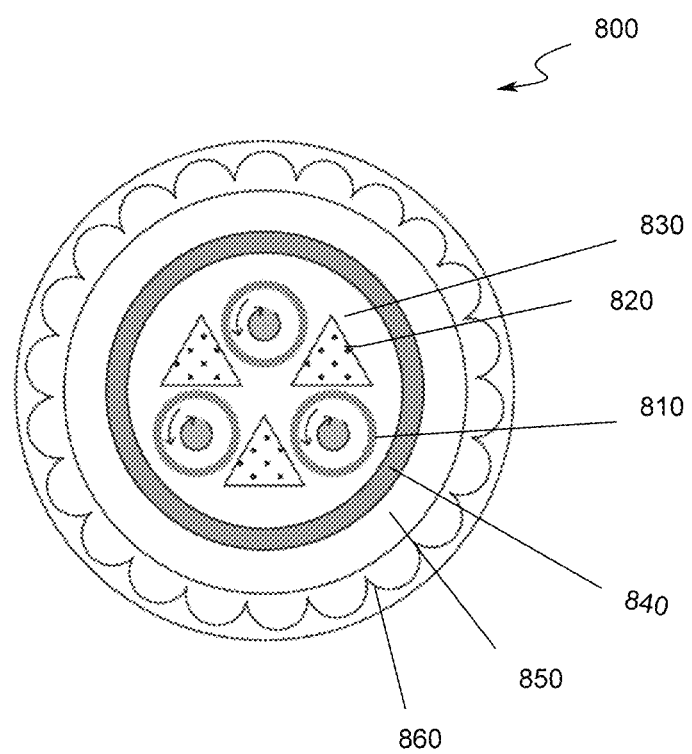
FIG. 8: Illustrates a superduct/superconductor core of an isentropic/supersonic expansion nozzle and thermally reactive nosecone.

Referring to FIG. 8, a system 800 is represented by a superduct superconductor core of an isentropic/supersonic expansion nozzle and thermally reactive nosecone. Vortex tube core 810 and superconductor core 820 are bundled in the center of the superconductor bundle. The superduct and superconductor cores are enclosed within a concentric helium return duct 830 (in event of a closed loop superduct configuration). The superconductor bundle is consequently wrapped in a super-insulation jacket 840 with vacuum chambers 850 and 860.

Figure 9:
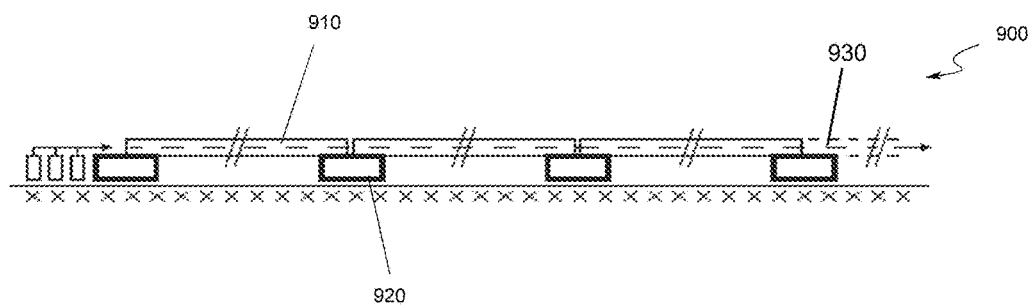
FIG. 9: Illustrates a daisy-chained superduct/superconductor core of a supersonic 4K absoluteo zero vortextube superconductor power transmission conduit.

Referring to FIG. 9, a system 900 is represented by a daisy-chained 910 one or more superduct superconductor core 920 of a supersonic 4K absolute zero (zero loss) vortex tube superconductor power transmission conduit 930.

Figure 10:
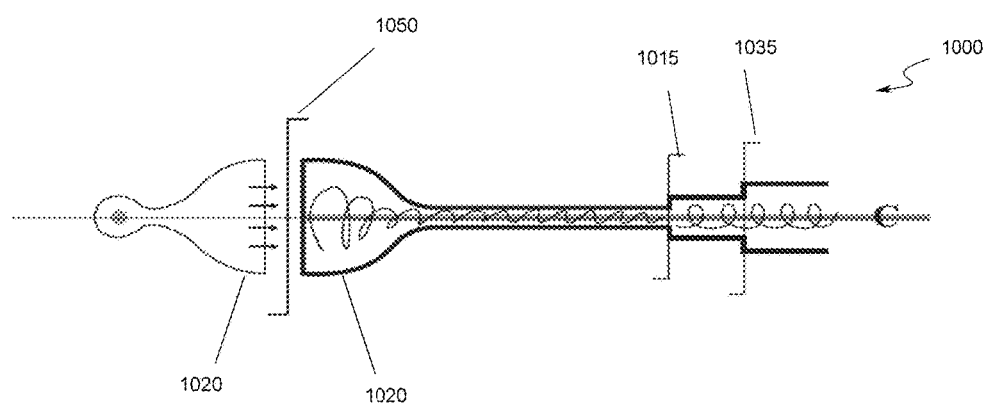
FIG. 10: Illustrates an elemental isentropic/supersonic expansion nozzle and thermally reactive nosecone with a multiplicity of throttling switches.

Referring to FIG. 10, a system 1000 is represented by an elemental isentropic/supersonic expansion nozzle 1010 and thermally reactive nosecone 1020 with a multiplicity of Joule-Thomson throttling switches 1050/1015/1035.

Figure 11:
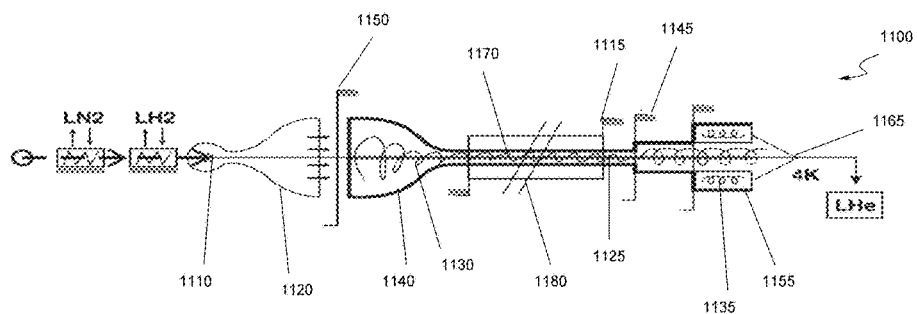
FIG. 11: Illustrates a Liquid Hydrogen regenerative cryogenically sub-cooled isentropic/supersonic expansion nozzle and thermally reactive nosecone with sudden Coanda expansion and planetary spline slots planetary.

Referring to FIG. 11, a system 1100 is represented by a liquid hydrogen regenerative cryogenically sub-cooled isentropic/supersonic expansion nozzle and thermally reactive nosecone with sudden Coanda expansion and planetary spline slots. A high pressure 2000 to 5,000 psi Helium 1110 is isentropically expanded in a supersonic expansion nozzle 1120 where after the MACH 2/3/4/5/10 (expanded) helium blast engages with the thermally reactive nosecone 1140 and first switch or singularity 1150 wherein the helium blast 1120 is transformed into a stochastic (harmonic) vortex flux 1130 prior to being throttled and transformed into a DOUBLE-HELIX (contra-rotating) vortex stream 1170 via sudden Coanda expansion second switch or singularity 1115 at the tail end of the vortex tube where after exit vortex stream 1125 is transformed into (contra-rotating) spline (vortices) 1135 third switch or singularity 1145 enabling the 4K complex Carnot Refrigeration process/switch 1180 via planetary SPLINE shafts 1155 into a 4K saturated/liquefacted (isentropic) continuum 1165. In accordance with the superduct synthesis the 4K saturated/liquefacted (isentropic) continuum 1165 is henceforth (regeneratively) flashed and pumped/pumped and flashed to the enabling 2000 to 5000 psi (expansion) pressure threshold replicating the superduct hypersonic/stochastic switching cycle indefinitely.

Figure 12:
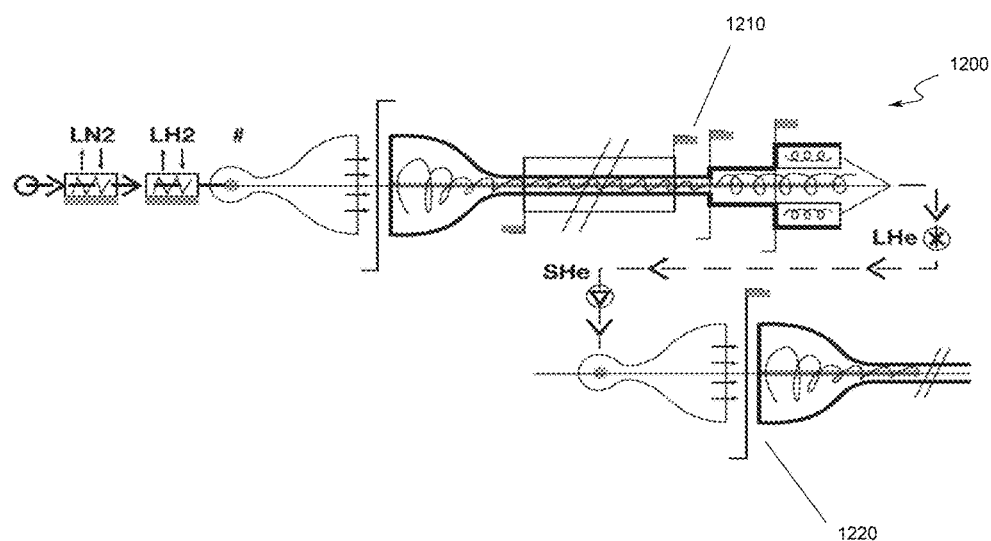
FIG. 12: Illustrates a flash pumping distilled/liquid Helium regressively (in lieu of compression) into the critical 5,000 psi expansion zone with recurring superduct stages.
Figure 13:
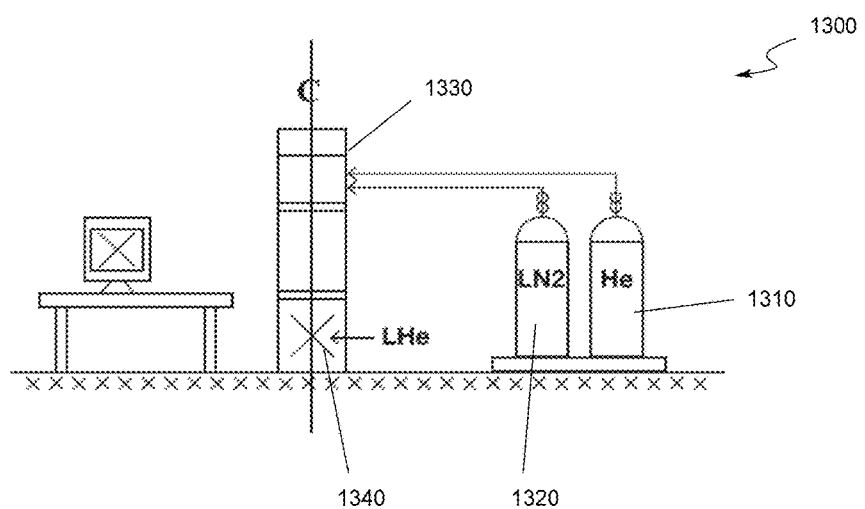
FIG. 13: Illustrates a setup for a personal/mobile liquid Helium distillation assembly.

Referring to FIG. 12, a system 1200 is represented by a flash pumping distilled/liquid helium regressively (in lieu of compression) into the critical 2000 to 5,000 psi expansion zone with recurring superduct stages like stage-1: 1210 and stage-2: 1220. Referring to FIG. 13, a system 1300 is represented by a setup for a personal/mobile liquid helium distillation assembly. A Helium source is represented by 1310 and Liquid Nitrogen source by 1320. The Collection tower is represented as 1330 and the Liquid Helium distilled is collected at 1340

Figure 14:
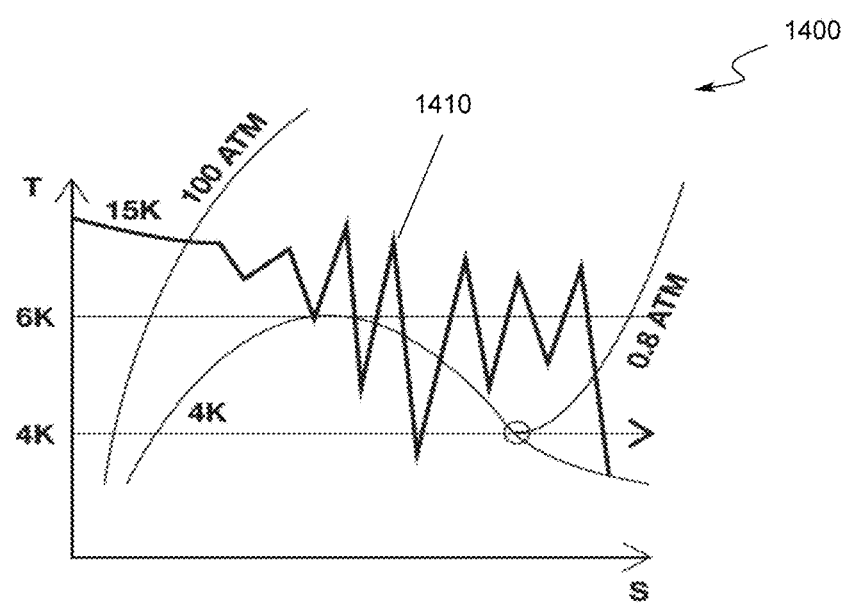
FIG. 14: Illustrates a saturation zone of helium and associated stochastic gyrations.

Referring FIG. 14, a representation 1400 refers to the saturation zone of helium and associated stochastic gyrations thereto. The high pressure helium is sequentially pre/subcooled with liquid nitrogen (90K) and/or liquid hydrogen (35K) and/or regenerative 4K helium (35K) and isentropically expanded via supersonic expansion nozzle 120/220/320 prior to engaging into the thermally reactive shafted nosecone 140/240/340—First Switch whereby the super/hypersonic continuum is transformed into a wildly gyrating (stochastic) vortex flux generating stagnation 20C thermal swing 1410 (@M5) whereby the saturation curve of helium (6K) is penetrated triggering complex-Carnot refrigeration process with a MLTD (mean log temperature difference) of 4K 146 above the absolute zero scale @0.8 ATM suction.

In accordance with the present/prevailing state of art liquefaction of helium is limited to Linde (1913)—compression regression and Claude (1950)—Turbo Expansion cryogenic chilling the reach the 2/3/4K helium distillation/liquefaction threshold. Because refrigeration becomes exponentially complex in the cryogenic zone, CARNOT efficiency falls dramatically below 50K whereby the cost @4K refrigeration=75× cost @300K refrigeration (and 150× multiplier @2K).

Given a basis of COP=4 (Carnot coefficient of performance @300K) 4K will render COP=5/75=0.053 and 2K will render COP=4/150=0.027. Conversely the superduct vortextube will render COP=4 because of (1) the stochastic (extreme vortex) and (2) nature of the stochastic gyrations that penetrates the helium saturation zone @15-25K outside the helium saturation zone. However, because (1) the superduct defaults into a virtual liquid helium production engine at 4 k because of zero superduct losses at 4K and (2) advent of helium sourcing concurrent with natural gas production, the superduct because of extreme stochastic efficiency opens a unique window of opportunity of (transcontinental) superconductor power transmission opportunity with concurrent (liquid/distilled) helium transportation from source to point of sale.

In accordance with the fundamental superduct postulation gaseous helium is compressed to 2000 to 5,000 psi and pre/subcooled to 35K into the cryogenic zone thereafter supersonically expanded proximal to absolute zero and in isentropic nozzle to MACH 5/6/7/8/9/10 prior to engaging the thermally reactive vortex shaft of the enabling stochastic vortex conversion switch first switch or singularity. In accordance with the isentropic equations of state expanding 5,000 psi HELIUM to 50 psi (Pr=5,000/50=100) will generate Tr=100^0.286=3.733 rendering 35/3.733=9.4K thermal threshold. However, the first switch stochastic perturbations will generate 9.4+0.8×9.4=16.9K swings will penetrate the HELIUM saturation zone proximal 5K generating 4K (LMA) logarithmic mean absolute zero threshold regressively @0.8 atm suction. By orchestrating liquid Nitrogen and/or liquid Hydrogen and/or regenerative distilled (HELIUM) pre/subcooling sequentially in sync with the enabling first switch hypersonic stochastic transformation, complex-Carnot refrigeration is instilled which is hence regeneratively replicated recursively through nth stage via an elemental pumping/flashing and/or flashing/pumping attribute. Pumping only constitutes a fraction (6%) of compression power @ 10R. [144/nRT(100^0.286−1)/144=144/1.4×53×10×3.2/144=144/2374=0.06 (6%)].

The invention claimed is:

1. An apparatus for a thermally reactive nosecone comprising:
   a tip, the tip having a slanted intake aperture;
   a shaft; a thermally reactive bore; and
   the nosecone functioning as a hypersonic vortex generator.

2. The apparatus for a thermally reactive nosecone as in claim 1, further comprising of a high pressure supersonic isentropic expansion nozzle additionally whereby liquid helium is distilled out of compressed helium by means of an incipient shockwave being transformed into a stochastic vortex flux first switch via the thermally reactive shafted nosecone of a vortex tube.

3. The apparatus for a thermally reactive nosecone as in claim 2, wherein a primary stochastic vortex flux is transformed into a contra-rotating double helix vortex by means of a sudden Coanda expansion second switch at a tail end of the vortex tube spawning Joule Thomson throttling refrigeration.

4. The apparatus for a thermally reactive nosecone as in claim 3, wherein an exit double helix vortex flux is reset into a supersonic isentropic continuum downstream of a Coanda expansion ramp by means of planetary spline slots and a consequential contra-rotating vortex flux third switch spawning second tier Joule-Thomson refrigeration.

5. The apparatus for a thermally reactive nosecone as in claim 4, wherein a high-pressure helium source is sub-cooled into a cryogenic zone via flashing fourth switch of liquid nitrogen proximal to 70K prior to hypersonic isentropic expansion and stochastic conversion.

6. The apparatus for a thermally reactive nosecone as in claim 5, wherein the high-pressure helium source is regeneratively chilled at fifth switch to proximal 35K prior to hypersonic expansion enabling complex Carnot refrigeration.

7. The apparatus for a thermally reactive nosecone as in claim 3, wherein a vortex tube shell sixth switch conforms as an absolute zero complex Carnot refrigeration core as a consequence of centrifuging and flashing of liquefacted helium in the vortex tube shell driven by a gyrating stagnation pressure surges and a double helix vortex core as a heat sink.

8. The apparatus for a thermally reactive nosecone as in claim 7, wherein the vortex tube shell is bundled into a superduct superconducting power transmission conduit.

9. The apparatus for a thermally reactive nosecone as in claim 8, wherein the vortex tube shell is stretched into 1-10 miles autonomous 4K superconductor conduits by means of extreme (5,000-10,000 psi) M7-10 Mach number expansion.

10. The apparatus for a thermally reactive nosecone as in claim 9, wherein the distilled liquid helium is regressively flashed and pumped in lieu of compression into a critical 2000 to 5,000 psi pressure zone and regeneratively intercooling recurring superduct stages.

11. The apparatus for a thermally reactive nosecone as in claim 9, further configured and scaled as a personal transportable liquid helium distillation plant.

* * * * *